May 20, 1969  R. W. TREHARNE  3,444,739
RADIANT ENERGY MEASURING INSTRUMENT
Filed Dec. 22, 1965  Sheet 1 of 2
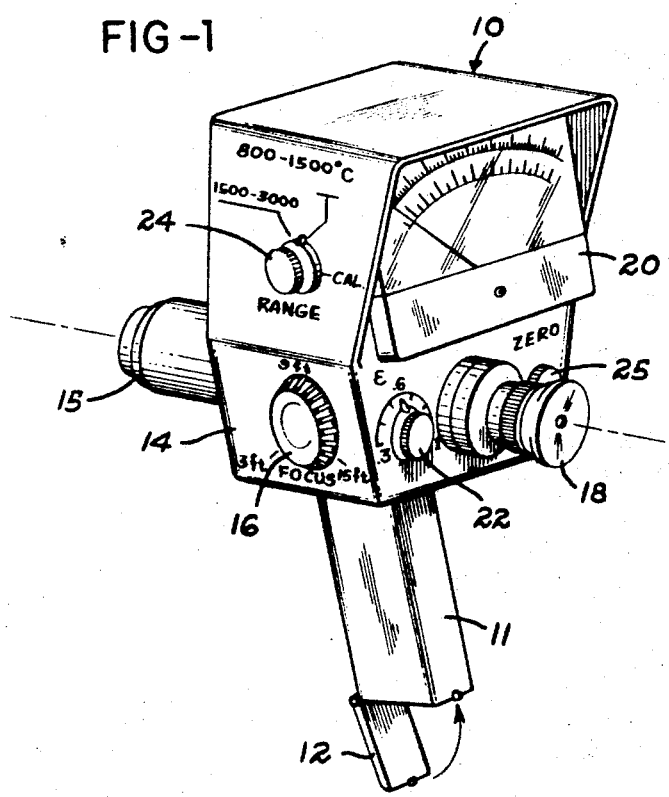
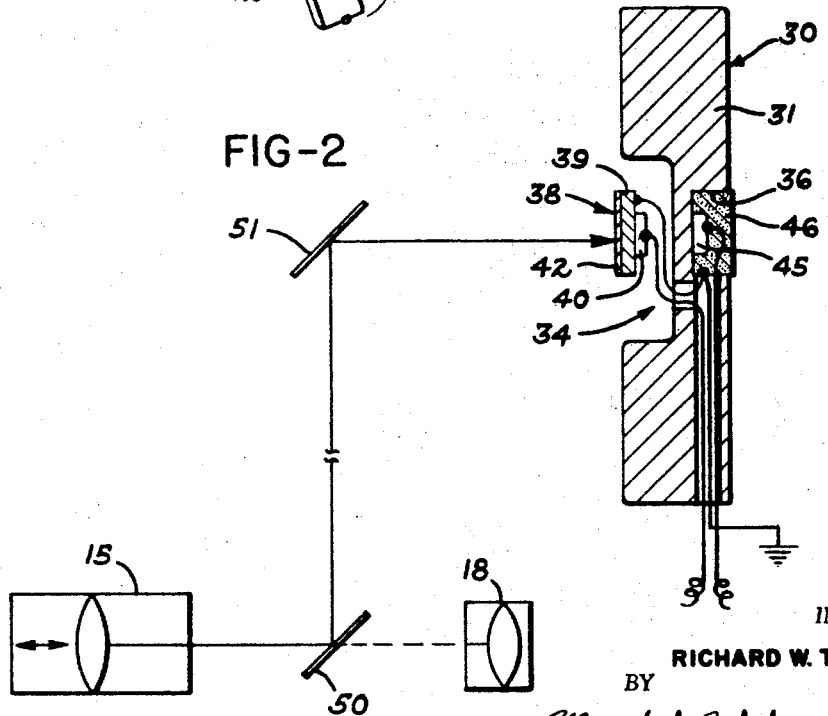
INVENTOR.
RICHARD W. TREHARNE
BY
*Marechal, Biebel, French & Bugg*
ATTORNEYS

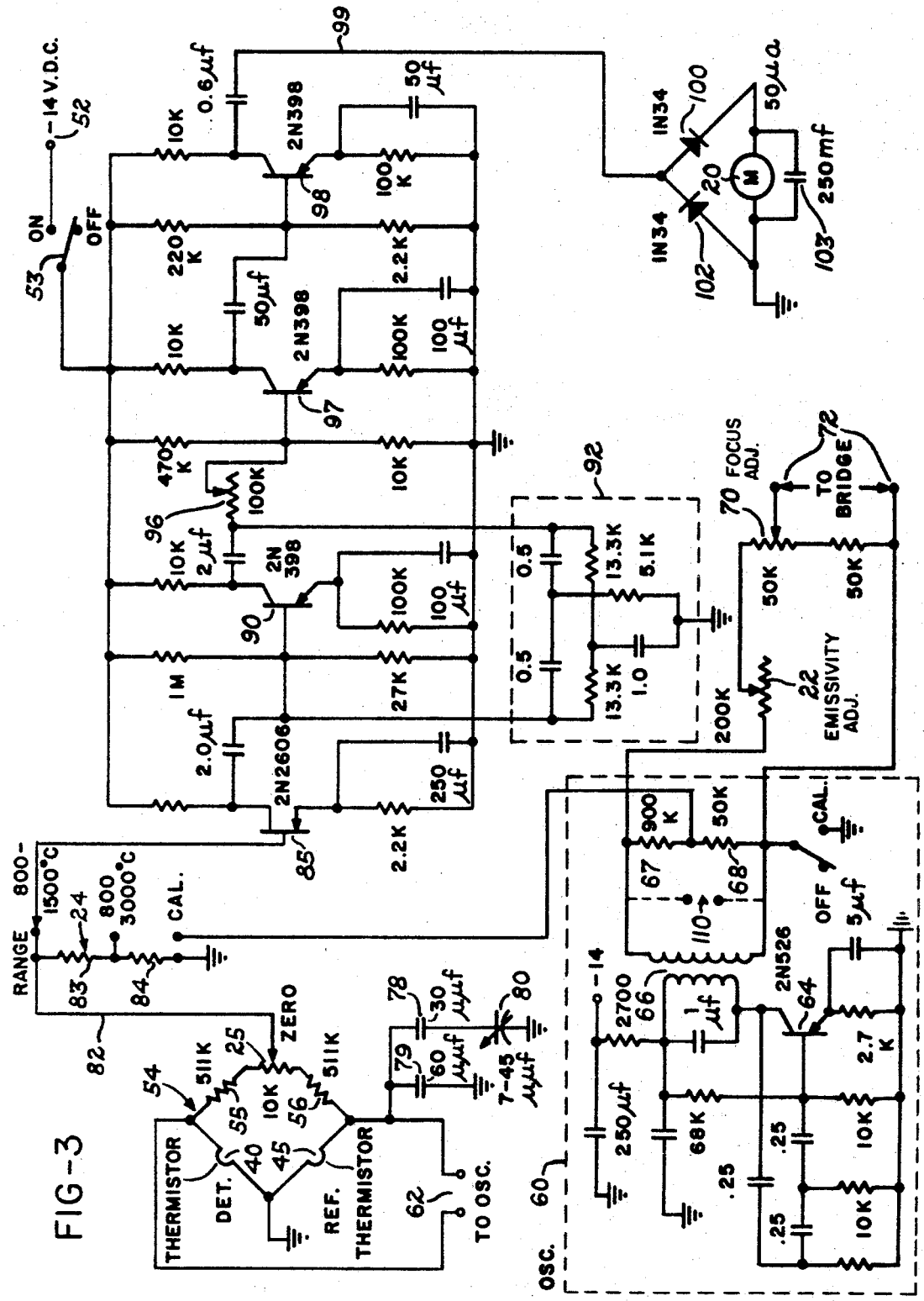

United States Patent Office 3,444,739
Patented May 20, 1969

3,444,739
RADIANT ENERGY MEASURING INSTRUMENT
Richard W. Treharne, Xenia, Ohio, assignor, by mesne assignments, to Kettering Scientific Research, Inc., a corporation of Delaware
Filed Dec. 22, 1965, Ser. No. 515,601
Int. Cl. G01k *13/00*
U.S. Cl. 73—355
4 Claims

ABSTRACT OF THE DISCLOSURE

A portable radiometer and radiation pyrometer using an AC bridge circuit with very low frequency AC across the bridge so that the system is relatively insensitive to changes in capacitance thereby providing high stability. When used as a pyrometer, a focus adjustment modifies the sensitivity of the instrument in accordance with range, and an emissivity adjustment is provided for compensating for emissivities of an object less than unity.

---

This invention relates generally to radiant energy and temperature measuring devices and more particularly to such a device and a circuit therefor for use either as a radiometer or as a pyrometer.

The subject matter of this invention may be considered in some respects, to be an improvement over that shown and claimed in my patent application Ser. No. 428,771, filed Jan. 28, 1965 now U.S. Patent No. 3,387,134, issued June 4, 1968 entitled Wave Length Independent, Direct-Reading Radiometer. In other respects, the present invention provides a pyrometer circuit and apparatus which utilizes some of the teachings of that application.

This invention is particularly directed to a radiant energy responsive device which is adapted to be self-contained and which uses a minimum of electrical energy so that long service life may be obtained from light-weight, compact dry cells or batteries. It is accordingly, an important object of this invention to provide a portable, hand-held radiation measuring device which is self-contained and light-weight.

A further important object of this invention is the provision of the selection, in a single instrument, of radiant energy and temperature measurements.

Another object of this invention is the provision of a pyrometer in which there is compensation in the electrical circuit for variations in distance between the instrument and the object being observed by the instrument.

A still further object of this invention is the provision of an emissivity adjustment, to compensate the instrument for variations in emissivity of a known material from that of a standard black body or a perfect radiator.

A still further object of this invention is the provision of a pyrometer or a radiometer in which the mechanical and electrical noise of a chopper is eliminated and in which the sensitivity is substantially increased.

Another object of this invention is the provision in a radiation measuring instrument of a low-frequency alternating current bridge which is characterized by the high phase stability.

These and other objects and advantages of the present invention will become apparent from the following description, the accompanying drawings and the appended claims.

In the drawings—

FIG. 1 is a perspective view of a portable pyrometer made according to this invention;

FIG. 2 is a vertical somewhat diagrammatic section through the pick-up head portion of the bridge, and diagrammatically illustrating a suitable optical layout; and FIG. 3 is an electrical schematic diagram of a combined pyrometer and radiometer circuit according to this invention.

Referring to the figures of the drawings which illustrate a preferred embodiment of the invention, the apparatus of the invention is shown in FIG. 1 as being incorporated into a hand-held, portable radiometer 10, which may include a hollow gripping handle 11 and a bottom trap door 12 through which batteries may be inserted into the handle. The radiometer 10 further includes a body 14 on which is mounted a forward-looking pick-up lens 15. The lens 15 is adjustable along its optical axis by rotating a focus knob 16 on the left side of the body 14. An eye piece 18 is provided at the rear panel of the body 14 through which an operator may observe the article being measured directly through the lens 15. The instrument further includes a direct reading meter 20 on which the temperature of the object observed may be read.

The instrument 10 may further include an emissivity control 22 by means of which an operator may adjust the instrument for deviations of the body or object, the heat of which is being measured, from the emissivity of a standard black body. Accordingly, the control 22 provides means for increasing the effective temperature reading which may be proportionately increased by increasing the sensitivity of the instrument to take into account the fact that the object being observed is not a true black body radiator.

The instrument 10 further includes a range switch 24 by means of which the operator can select the desired scale on the instrument meter 20, and a meter zero adjust control 25.

The instrument 10 preferably includes a built-in detector probe 30 which may be internally constructed according to the teachings of my application Ser. No. 428,771, and shown in enlarged vertical section at 30 in FIG. 2. The probe 30 includes a body 31 preferably formed of a good heat sink material, preferably one of high specific heat, such as bass. The body 31 acts as a stable thermal reference source for the sensing thermistors.

Situated on either side of the probe are cylindrical cavities 34 and 36. A radiation sensing element 38 is mounted in but spaced from the wall of cavity 34. The radiation sensing element 38 consists of a target disc 39, a first heat sensing thermistor 40 mounted as an integral part of and on one side of the disc 39, and a radiation absorbing or converting optically-flat black material 42 covering the exposed side of the target disc. The target disc 39 may be, for example, a 0.475 cm. diameter by 0.3 mm. thick copper disc, however, other materials and different dimensions have been successfully employed, and provides the means for converting radiant energy received from outside the instrument into heat.

In order to measure incident radiation in the near ultraviolet and visible as well as in the infrared range, the radiation absorbing material 42 is optically-flat black and may be finely divided carbon black. However, the coating material is preferably optically-flat black lacquer such as Krylon (Krylon, Inc.) or Black Velvet Coating (3M Company). With materials such as Krylon, a flat response, within three percent, from at least 0.2 micron to more than 40 microns can be obtained.

Contained within the second cavity 36 is a reference thermistor 45. The thermistor 45 is mechanically and electrically attached to the probe body 31, and is surrounded in the cavity by a potting compound 46. The thermistor 45 is shielded by the probe body 31 from the incident radiant energy so that, in the absence of incident radiant energy, both thermistors will sense the same abmient temperature environment.

As shown in FIG. 2, the objective lens 15 is adjustable such as by rotating the knob 16, and the image therefrom is transmitted by a partially silvered mirror 50 to a full silvered mirror 51 from which it is directed onto the surface of the target disc 39. A small portion of the light, such as 10 percent, is permitted to pass through the half silvered mirror to the eye piece which is diagrammatically illustrated at 18 in FIG. 2. The mirror 50 forms a beam splitting means for passing a portion of the image to the eye piece.

FIG. 3 shows a circuit diagram which may be formed on a printed circuit board and received within the body 14. The circuit is operated on a −14 volt power supply 52 which may conveniently take the form of two 7 volt dry batteries received within the handle 11. An on-off control 53 (not shown in FIG. 1) applies battery power to the circuit.

The thermistors 40 and 45 are shown as being connected in two of the legs of a wheatstone bridge 54, including resistors 55, 56 and the zero-adjusting potentiometer 25.

One important feature of the invention is the high sensitivity and stability of the circuit. For this purpose, the power supply for the bridge is an alternating current source from an oscillator 60. The output of the oscillator 60 is applied across the bridge 54 at the bridge terminals 62. The oscillator 60 is of the phase-shift type using R-C phase shifting components so that there is a 180° phase shift between the collector and the base of the oscillator transistor 64. The resistor and capacitor components of the oscillator 60 are chosen so as to provide a relatively low rate of oscillation, preferably less than 1000 cycles per second, and, for example, only 27 cycles per second at a 9 vole RMS output. This comparatively low rate of oscillation is applied through a coupling transformer 66 to a pair of voltage dividing resistors 67 and 68 which provide a calibration signal. The output is further applied through the emissivity control potentiometer 22 and across a focus potentiometer 70 to oscillator output terminals 72 which are normally connected to the bridge terminals 62.

The circuit is accordingly one in which a relatively low frequency AC current is applied across the bridge. By using the low frequency AC current, the benefits of an AC amplifier circuit are retained, such as good overall stability, while the disadvantages of the usual AC bridge are eliminated. Chief among these is the problem of phase stability which is acute in the critical balancing of medium and high frequency bridges due to the distributed capacitance between the bridge components. This is particularly a problem in installations where the thermistors 40 and 45 comprising a portion of the bridge are located at the end of a cable such as may be the case when the invention is applied to a radiometer of the general type disclosed and claimed in my copending application.

As previously noted, the emissivity control 22 provides adjustment of the sensitivity of the instrument for known variations from the emissivity of a black body by varying the bridge voltage. For example, the emissivity of iron may be .6 and aluminum .8, and the control 22 may be accordingly calibrated so that known variations can be directly inserted.

The focus control 70 is ganged for simultaneous movement with the focus knob 16, and further makes a correction in the bridge voltage in accordance with distance to the object, the temperature of which is being measured. However, it is within the scope of this invention to provide a fixed resistance or no resistance at all in place of the control 70 and a fixed focus lens with a limited range for example from 9 to 12 feet, with adequate accuracy over this range. This would eliminate the need for a focus adjustment 16, and the mechanically connected focus control 70.

One leg of the bridge is loaded by small capacitors 78 and 79 and trimmer capacitor 80 providing phase balance adjustment for the bridge. Once the phase adjustment has been established, no further adjustment of the capacitor 80 is normally required. The output of the bridge is taken off the wiper arm of the zero adjust potentiometer 25 on a lead 82 and is applied to a range switch 24. The range switch 24 may preferably consist of a series of resistors 83, 84 to ground, in which the number and the value of the resistors depend upon the calibration of the meter 20. For the purpose of a pyrometer, the range switch 24 may conveniently have two positions, as shown in FIG. 1, with the position of greatest sensitivity covering the range of 800 to 1500° C., and a further position of lower sensitivity which covers a range of 1500 to 3000° C.

The range switch may conveniently have a third calibrate position in which the bridge is disconnected from the circuit, and in which the switch wiper is connected directly to the center tap between the calibration resistors 67 and 68. This places a known quantity or input into the amplifier circuit for the purpose of correcting the deviations in the gain of the transistor amplifier due to aging, drift, and the like.

The output of the range switch 24 is connected to the the the base of a field effect transistor 85. A field effect transistor preferably used due to its high input impedance and minimum loading upon the bridge. A straightforward three-stage transistor amplifying circuit follows in which the electrical components are particularly chosen to transmit the relatively low-frequency signal within a minimum of attenuation. Thus, the output of the field effect transistor 85 is applied to the first transistor 90 of the three-stage amplifier. A negative feed back circuit in the form of a T-filter 92 is connected between the collector and the base of the transistor 90 and is tuned to discriminate against the frequency of the oscillator 60. In this manner, all other frequencies are fed back and attenuated.

A calibrate poteniometer 96 (not shown in FIG. 1) is connected at the input to the second transistor 97. The calibrate potentiometer 96 is adjustable when the range switch 24 is in the calibrate position in order to effect a predetermined scale deflection on the meter 20. In this way, the gain of the transistor amplifier and oscillator are calibrated to a known quantity, while the bridge circuit remains disconnected.

The output of the third transistor 98 is applied by lead 99 to a half-wave rectifier comprising diodes 100 and 102. The diode 100 is connected to apply the rectified signal to the meter 20, and a buffer capacitor 103 is connected across the meter to provide filtering. The meter may be calibrated to read directly in degrees centigrade.

The circuit and apparatus of this invention may be readily adapted for use as a direct-reading, wave length-independent radiometer of light weight and high sensitivity. When used as a radiometer, the probe 30 is preferably constructed on the end of a cable, as shown and described in my copending application. Since radiant energy measurements are assumed as coming from a comparaticely great distance so that the rays may be considered to be parallel, these rays may be considered as a collimated beam of light, and no focusing lens 15 is used. Such radiometers have particular use in laboratories and the like as an aid to photobiologists and photochemists investigating, for example, photosynthesis and the like. Further, such instruments may be used to measure continuous wave lasers such as of the heliumneon gas variety. When the instrument is used for radiometer measurements, a fused quartz window is preferably placed in front of the thermistor 40, as described in the above application.

For this purpose, the emissivity control and the focus control are eliminated or disconnected, and the output of the oscillator 60 is applied at the terminals 110 directly to the bridge circuit terminals 62. Further, it is preferable to provide a range switch with a plurality of taps, and the meter scale may read directly in ergs per centimeter$^2$-sec. or milliwatts/cm.$^2$. For example, seven ranges of sensitivity may be provided from $2.5 \times 10^3$ to $2.5 \times 10^6$ ergs per centimeter$^2$-second.

The invention accordingly provides a lightweight, highly stable and accurate instrument of wide versatility. The correlation of the focus control with the focus potentiometer 70 permits maintenance of accuracy over a wide range of use. The internal provision for calibration permits the unit to be readily calibrated. The dual-thermistor probe using a reference thermistor 45, and a detecting thermistor 40 in close association with a wave length independent converter disc 39 provides accurate and consistent measurements of radiation intensity and/or temperature. The use of an AC bridge eliminates the necessity for a mechanical or electrical chopping in order to provide stability to the circuit.

The relative low frequency operator is characterized by high stability and absence of capacitive coupling in the bridge. The tuned negative feed-back circuit 92 discriminates against the bridge frequency with the resulting attenuation of all other frequencies, providing a high gain AC amplifier of high stability. All the components may be readily packaged into a compact instrument 10 for direct pyrometer readings. Alternatively, a remote probe constructed at the extended end of the cable may be used where the instrument is primarily intended for radiometer measurements.

It is within the scope of this invention to provide a pyrometer which is capable of operating in a range below 800° C. Generally speaking, a lens 15 which is made from quartz or a good grade of optical glass will pass very little, of the infra-red energy in the relatively long wave length region below the visible range of 800° C. However, optical components are available which use infra-red transmitting material and will transmit wave lengths representing temperatures down to as low as 26° C. or lower, and it is within the scope of this invention to use such components for the lens 15 for measurements in such range as desired. With presently-available materials, it may be necessary to provide a parallel path for the view finder 18 or a simple mechanical sight, due to the fact that available infra-red transmitting material is opaque or nearly opaque to the eye.

While the form of apparatus herein described constitutes a preferred embodiment of the invention, it is to be understood that the invention is not limited to this precise form of apparatus, and that changes may be made therein without departing from the scope of the invention.

What is claimed is:

1. A pyrometer or radiometer comprising a bridge circuit including first and second thermistors, a black target which converts light to heat, said first thermistor being operatively associated with said target, said second thermistor being responsive to ambient temperature, an adjustable focusing lens positioned to focus an image of the object being observed on said target, a power source for said bridge including a low frequency oscillator connected to apply an alternating current across said bridge, voltage control means adjustable concurrently with the focusing of said lens for varying the sensitivity of said meter by varying the voltage output of said oscillator to compensate for variations in intensity of the radiant energy falling on said target with variations in distance of said meter from said object, further means in said meter for adjusting the response thereof in accordance with the emissivity factor of said object, and an amplifier connected to receive the unbalance signal of said bridge and to provide an indication of said unbalance as an indication of the temperature of said object.

2. A portable hand-held self-contained pyrometer comprising a body including a gripping handle, a direct reading meter supported on said body, a forward looking objective lens mounted on said body and being adjustable along its optical axis for focusing, an eyepiece mounted on said body, a partially silvered mirror in said body positioned to direct a small portion of the light received from said objective lens to said eye piece, a radiant energy-to-heat converter in said body positioned with respect to said mirror to receive an image from said lens and to convert the image received thereon to heat, a thermistor bridge circuit including a first thermistor closely associated with said converter and responsive to the temperature thereat and a second thermistor responsive to the ambient temperature of said pyrometer, a transistor amplifier connected to receive the output of said bridge and connected to operate said meter in proportion to the degree of bridge unbalance as an indication of the temperature of the image received through said lens, a movable focusing control, and an electrical control connected for movement with said focusing control for varying the sensitivity of said transistor amplifier in accordance with the position of said lens.

3. The pyrometer of claim 2 further including an emissivity control connected to said circuit to vary the sensitivity of said circuit in accordance with known variations in emissivity from that of a perfect black body radiator of an object being observed through said eyepiece.

4. A radiant energy measuring instrument adapted to measure total radiation from an object and having high stability and being relatively insensitive to changes in stray capacitance, comprising a bridge circuit including a pair of thermistors, means converting radiant energy from such object into heat, means mounting one of said thermistors at said converting means to be responsive to such heat, means mounting the other of said thermistors to be responsive to ambient temperature, a power supply for said bridge circuit including an oscillator connecting to apply alternating current across said bridge circuit at a frequency less than 1,000 cycles per second, an amplifying circuit for receiving the output of said bridge circuit and amplifying the AC signal therefrom, a detector, readout means connected to receive the signal from said detector to provide an indication of the degree of unbalance of said bridge corresponding to the total radiant energy falling on said converting means, a calibration circuit including means defining a fixed output from said oscillator, and switch selector means connected to select said fixed output and simultaneously to disconnect said bridge circuit from said amplifying circuit.

References Cited

UNITED STATES PATENTS

| | | |
|---|---|---|
| 2,587,602 | 3/1952 | Crandell. |
| 2,761,072 | 8/1956 | Wormser 73—355 |
| 2,855,492 | 10/1958 | English 73—355 XR |
| 2,976,730 | 3/1961 | Howell 73—355 |
| 3,017,513 | 1/1962 | Messelt. |
| 3,096,650 | 7/1963 | Lowenstein et al. 73—355 |
| 3,161,771 | 12/1964 | Engborg et al. 73—355 XR |
| 3,179,805 | 4/1965 | Astheimer. |
| 3,187,574 | 6/1965 | Mason et al. 73—355 |

LOUIS R. PRINCE, *Primary Examiner.*

FREDERICK SHOON, *Assistant Examiner.*

U.S. Cl. X.R.

88—22.5; 250—83.3